April 26, 1932.                     W. L. CLOUSE                     1,856,028
                          BLANK CUT-OFF AND CARRY-OVER
                      Filed Nov. 10, 1930      5 Sheets-Sheet 3
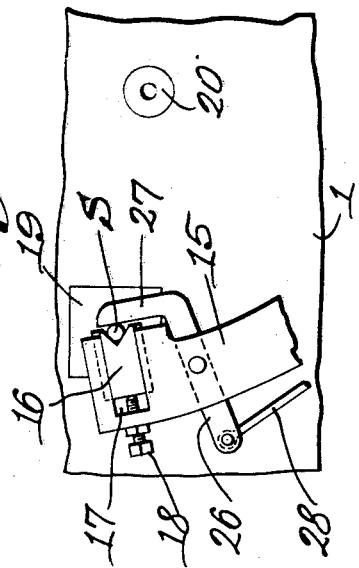
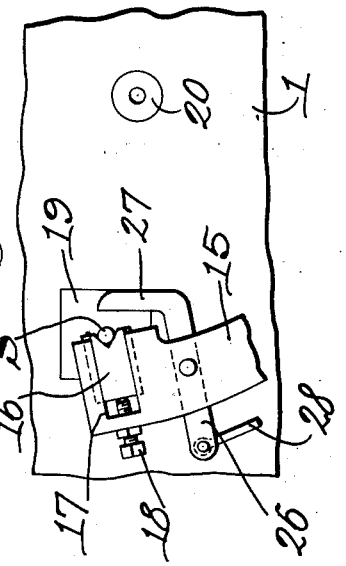
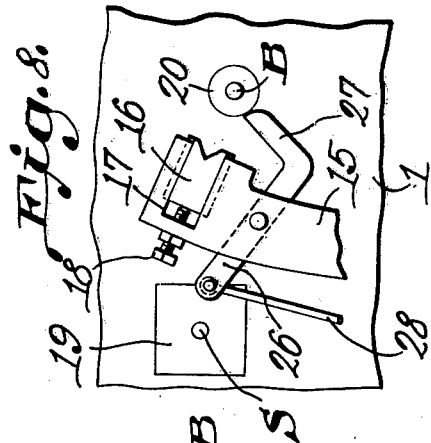
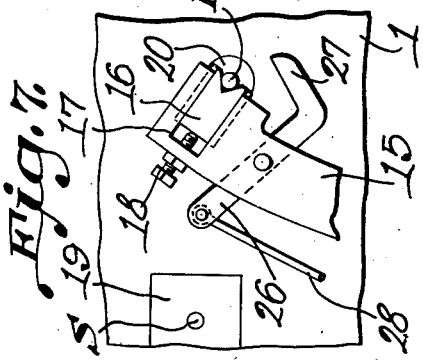
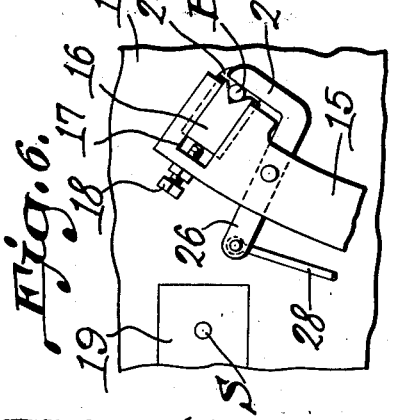
W. L. Clouse  Inventor
By C. A. Snow & Co.
                Attorneys.

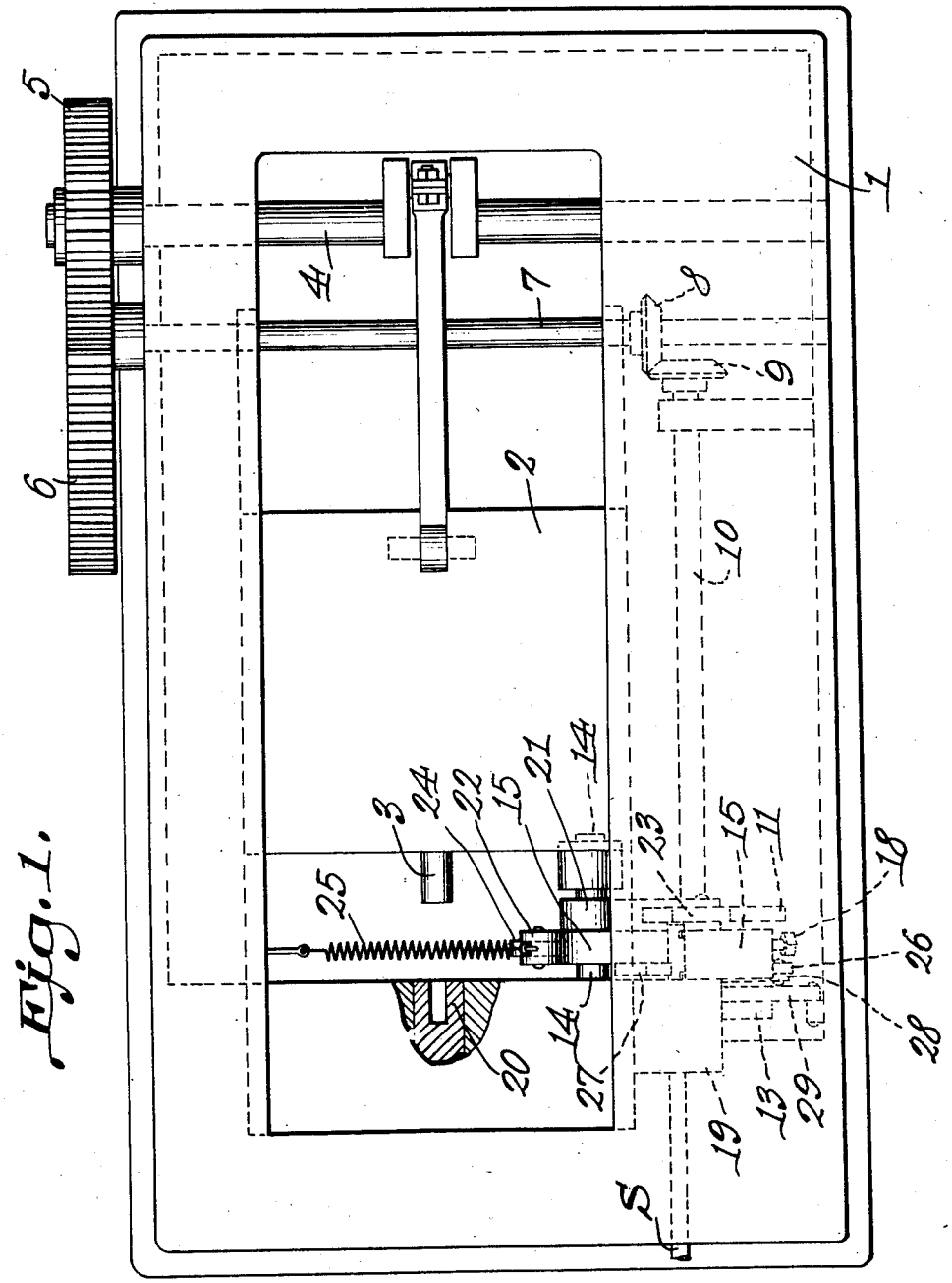

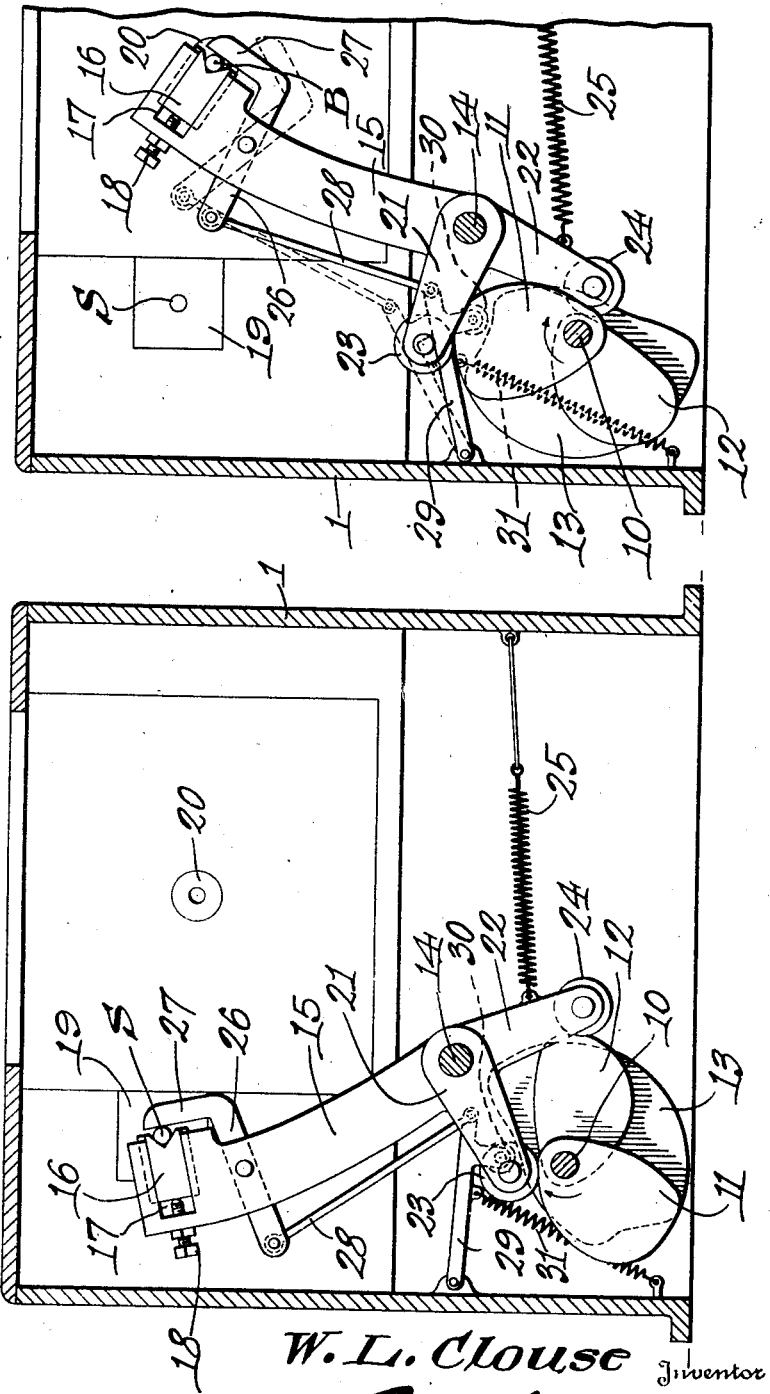

April 26, 1932.  W. L. CLOUSE  1,856,028
BLANK CUT-OFF AND CARRY-OVER
Filed Nov. 10, 1930   5 Sheets-Sheet 4
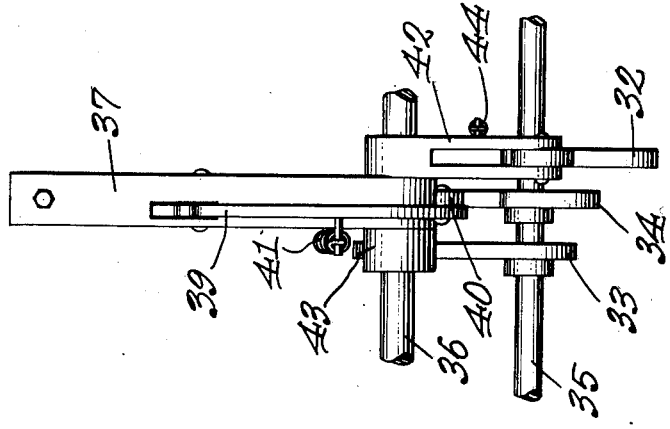
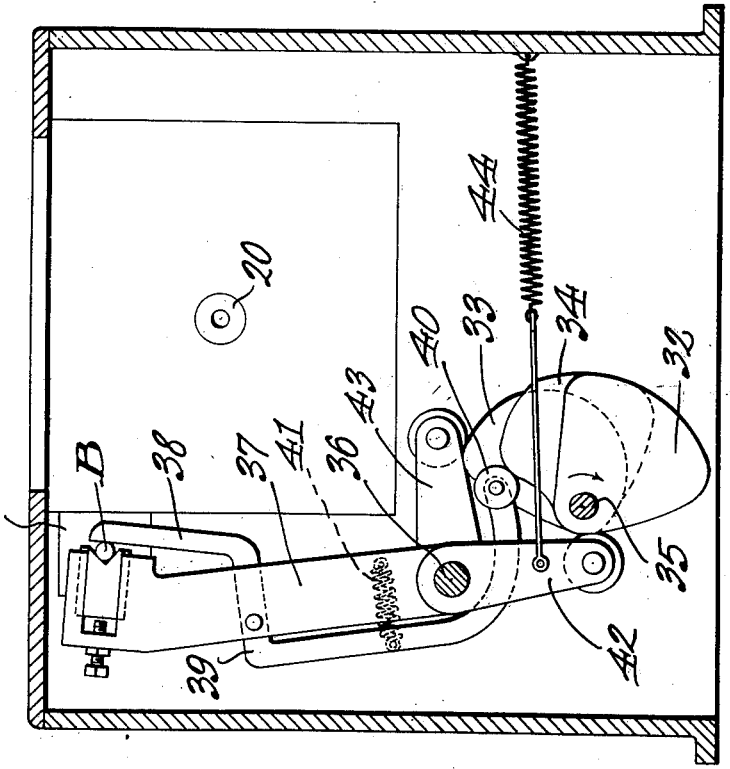

April 26, 1932. W. L. CLOUSE 1,856,028
BLANK CUT-OFF AND CARRY-OVER
Filed Nov. 10, 1930 5 Sheets-Sheet 5
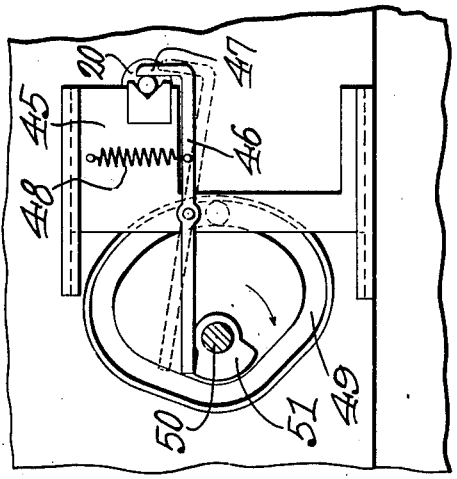
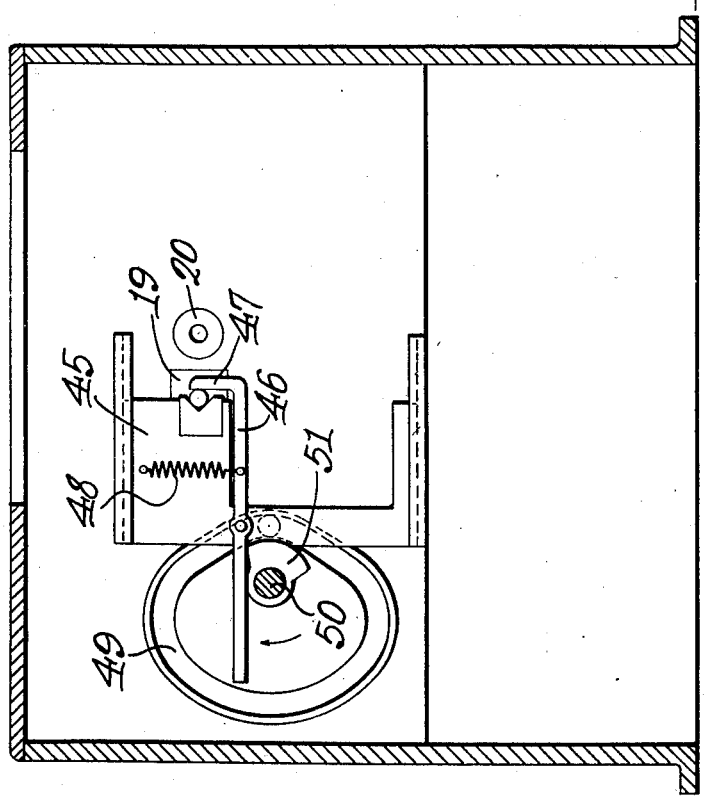
W. L. Clouse Inventor
By C. A. Snow & Co.
Attorneys.

Patented Apr. 26, 1932

1,856,028

UNITED STATES PATENT OFFICE

WILLIAM L. CLOUSE, OF TIFFIN, OHIO, ASSIGNOR TO THE NATIONAL MACHINERY COMPANY, OF TIFFIN, OHIO

BLANK CUT-OFF AND CARRY-OVER

Application filed November 10, 1930. Serial No. 494,791.

This invention relates to a blank cut-off and carry-over for metal-working machines such as cold headers, forging machines, etc.

It is an object of the invention to provide a simple and efficient mechanism whereby a blank can be cut from a length of stock, tightly gripped, and then carried to position for engagement by the shaping dies.

Another object is to provide a structure of this nature having continuously rotating means for actuating it in properly timed relation to the movable shaping die or dies.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 1 is a view partly in section and partly in plan of a metal-working machine such as a cold header, having the present improvements.

Figure 2 is a vertical transverse section through the machine showing the cut-off and carry-over mechanism in elevation at the beginning of the shearing action, the stationary die and adjacent parts also being shown in elevation.

Figure 3 is a similar view showing the positions of the parts when the severed blank is brought to the stationary die.

Figure 4 is a detail view of the cut-off and carry-over members in their first position in a cycle of operations.

Figure 5 illustrates the second position.

Figure 6 shows the third position.

Figure 7 shows the fourth or "released" position.

Figure 8 illustrates the parts returning to their place of starting.

Figure 9 is a view partly in section and partly in elevation of a modified mechanism.

Figure 10 is a side view of the mechanism shown in Figure 9.

Figure 11 is a view similar to Figure 9 showing another form of the machine.

Figure 12 is a like view showing the mechanism in other positions.

Referring to the figures by characters of reference, 1 designates the body of a metal-working machine, such as a cold header, having a heading slide 2 carrying a shaping die 3. This slide can be operated by any suitable means driven by a main shaft 4 which is operatively connected, as by gears 5 and 6, to a transverse timer shaft 7.

The timer shaft is adapted to transmit motion through gears 8 and 9 to a cam shaft 10 which, in the structure illustrated, in Figures 1 to 8, carries three cams 11, 12, and 13. A rock shaft 14 is journaled close to the cams and carries an arm 15 in which a cut-off die or shear element 16 is mounted. This die can be supported in a slot 17 and bear against an adjusting screw 18, whereby the die can be advanced or retracted relative to its carrying arm 15.

The active edge of the movable cut-off die 16 is adapted to work close to and across a stationary shearing or cut-off die 19 located at the point where stock is fed into the machine. It is adapted to travel to a point close to the stationary shaping die indicated generally at 20.

The rock shaft 14 has arms 21 and 22 extending therefrom and adapted, respectively, to advance the carrying arm 15 from its initial position shown in Figure 4 and return it to said position. Arm 21 has a roller 23 for engaging the periphery of cam 11 while arm 22 has a roller 24 for engaging cam 12. A spring 25 connected to arm 22 acts to hold roller 23 normally in contact with cam 11.

A gripper including a lever 26 and a jaw 27 is fulcrumed on the carrying arm 15 and a rod 28 connects this lever to a lever 29 carrying a roller 30 adapted to engage the cam 13. A spring 31 acts to draw lever 29 downwardly and shift the jaw 27 toward die 16.

Stock S in the form of a wire or bar is adapted to be fed a desired distance into the machine while the parts are positioned as shown in Figure 4. The several cams are so timed that immediately following the insertion of the stock cam 13 will move from engagement with roller 30 so that spring 31 will shift the jaw 27 of the gripper and cause it to bind on the projecting stock as shown in Figures 2 and 5.

Thereafter cam 11 comes into action and, while cam 13 is clear of roller 30, arm 21 will be shifted to swing the carrying arm 15 to the position shown in Figures 3 and 6. Thus the blank B will be sheared from the stock and carried to position directly in front of the recess in stationary shaping die 20 as shown in Figure 6. During this operation the heading slide is advancing toward its work which is engaged by die 3 and pressed into die 20. Closely following contact with the blank by die 3 cam 13 shifts lever 29 to quickly swing jaw 27 away from the blank (see the dotted position in Figure 3 and full position in Figure 7), this operation being quickly followed by the action of cam 12 on arm 22 to swing back the arm 15 as in Figure 8 and then to its initial position shown in Figure 4.

The action of the parts illustrated in Figures 6, 7, and 8, occurs before the die 3 can strike the die 16 and jaw 27 but following the contact of die 3 with the blank. This necessitates very quick action which, however, is supplied by the cams, springs, and parts actuated thereby, all of which act positively in timed relation to the heading slide.

The cam and lever arrangement shown and described can be modified in many ways and the same results obtained. In Figures 9 and 10 a simplified arrangement has been illustrated. This includes cams 32, 33, and 34 carried by shaft 35 which correspond with cams 11, 12, and 13, and shaft 10. A rock shaft 36 has a carrying arm 37 and the gripper jaw 38 is carried by a lever 39, one arm of which is provided with a roller 40 for engaging cam 34. A spring 41 connects levers 37 and 39 for holding the jaw 38 normally in gripping position. Arms 42 and 43 are adapted to be actuated by cams 32 and 33 respectively and a spring 44 exerts a constant pull on arm 42. These parts all operate in properly timed relation to the heading slide to cut-off, carry-over, and release a blank in the manner heretofore described.

In Figures 11 and 12 the carrying arm is in the form of a slide 45 on which a lever 46 is fulcrumed. This lever carries a gripper jaw 47 and a spring 48 serves to hold the jaw normally in gripping position. A cam 49 on shaft 50 acts to reciprocate the slide and another cam 51 operates the gripper jaw through lever 46. Thus the slide and jaw can be shifted in properly timed relation to the heading slide to shear off a blank, carry it to the shaping die 20 as in Figure 12, release the blank, and return to the point of starting.

As before stated other means can be employed for shearing, carrying, and releasing the blank in the timed relation described without departing from the spirit of the invention as claimed.

What is claimed is:

1. In a metal-working machine the combination with stationary and movable shaping dies, of continuously rotating cams operating in timed relation to the movable die, a carry-over including a movable member, a shearing die and a gripper each carried solely by said member, the gripper being pivoted on the member at a point removed from the point of support of the member and being movable with said member and relative to the shearing die, cam operated means for shifting the movable member to cut off a blank, force it to the stationary shaping die for engagement by the movable shaping die, and return to the point of starting, and cam operated means for imparting an abrupt swinging movement to the gripper relative to the movable member to grip a blank upon the shearing die and hold it during the transfer operation, and thereafter abruptly release the blank, and return with the movable member, all in properly timed relation.

2. A carry-over for metal-working machines including a member mounted for back and forth movement, a shearing element carried by the member, a gripper pivoted on said member at a point remote from the point of support of the member and movable with the member, said gripper including a jaw movable relative to the shearing element, and continuously rotatable means for shifting said member and gripper to successively grip, shear, carry, and release a blank engaged thereby.

3. A carry-over for metal-working machines including a member mounted for back and forth movement, a shearing element carried thereby, a gripper pivoted on the member at a point remote from the point of support of the member and movable with said member, said gripper including a jaw movable about the pivot of the gripper relative to the shearing element, cams mounted for continuous rotation, and means actuated by the cams for shifting said member and gripper in properly time relation to successively grip, shear, carry, and release a blank engaged thereby.

4. The combination with stationary and movable shaping dies of a metal-working machine, of a carry-over including a member mounted for back and forth movement between said dies, a shearing element carried thereby, a gripper movable with said member and pivoted thereon at a point removed from the point of support of the member, said gripper including a jaw movable relative to the shearing element about the pivot of the gripper, cams mounted for continuous rotation in properly time relation to the movable shaping die, and means operated by the respective cams for shifting said member and gripper in properly timed relation to successively grip and shear a blank, convey it to the stationary shaping die for engagement by the movable shaping die, and then release the blank and return to the point of starting.

In testimony that I claim the foregoing as my own, I have hereto affixed my signature.

WILLIAM L. CLOUSE.